United States Patent [19]
Kawaguchi

[11] Patent Number: 5,822,572
[45] Date of Patent: Oct. 13, 1998

[54] ELECTRONIC EQUIPMENT THAT CHANGES ACTIVE TIME OF SIGNALS FOR A PERIPHERAL CIRCUIT FROM A MICROPROCESSOR THAT SWITCHES ITS OPERATING CLOCK FREQUENCY

[75] Inventor: Tadashi Kawaguchi, Kawasaki, Japan

[73] Assignee: Canon Kabushiki Kaisha, Tokyo, Japan

[21] Appl. No.: 611,750

[22] Filed: Mar. 6, 1996

[30]     Foreign Application Priority Data

Mar. 8, 1995   [JP]   Japan ................................ 7-048174

[51] Int. Cl.⁶ .................................................. G06F 1/04
[52] U.S. Cl. ..................................... 395/556; 395/559
[58] Field of Search .................................... 395/555, 556, 395/558, 559, 560, 750.04

[56]           References Cited

U.S. PATENT DOCUMENTS 5,086,387   2/1992   Arroyo et al. ........................... 395/556
5,432,468   7/1995   Moriyama et al. ...................... 327/152

*Primary Examiner*—Dennis M. Butler
*Attorney, Agent, or Firm*—Fitzpatrick, Cella, Harper & Scinto

[57]           ABSTRACT

Electronic equipment having a CPU. The operating clock frequency that is switched according to the access state to the CPU is detected. The active time provided for each of a plurality of timing signals for rendering a peripheral circuit operable is shortened according to the detected operating clock frequency. The resulting timing signals are then output to the peripheral circuit.

12 Claims, 11 Drawing Sheets

ROM READ CYCLE IN THE MORMAL MODE

ELECTRONIC EQUIPMENT THAT CHANGES ACTIVE TIME OF SIGNALS FOR A PERIPHERAL CIRCUIT FROM A MICROPROCESSOR THAT SWITCHES ITS OPERATING CLOCK FREQUENCY

BACKGROUND OF THE INVENTION

1. Field of the Invention

The present invention relates to electronic equipment including a central processing unit (CPU) that is capable of changing the operating frequency by rewriting a register or by changing the frequency of applied clock signal and peripheral circuits, such as a read only memory (ROM) and the like, controlled by the CPU.

2. Description of the Related Art

In electronic equipment having the former type, for example, of CPU described above, the timing of a control signal to be input into a peripheral circuit is provided based on the system clock output from the CPU. If, therefore, the operating frequency of the CPU is decreased, the enabling time of a control signal is disadvantageously lengthened by the amount equivalent to a decrease in the operating frequency.

Consequently, the following problem is encountered by electronic equipment which accesses a peripheral circuit for a plurality of times. The enabling time of a control signal is prolonged by the amount equivalent to a decrease in the operating frequency, as described above. Therefore, although there is a decrease in power consumption in the CPU, power consumption in a peripheral circuit is conversely increased, which hampers power saving of the overall equipment.

SUMMARY OF THE INVENTION

Accordingly, in order to solve the above problems, it is an object of the present invention to provide electronic equipment that can correctly set the active time of various timing signals to be input into a peripheral circuit to be controlled by a CPU when the operating clock frequency of the CPU is changed, whereby power consumption of the peripheral circuit can be inhibited along with a decrease in power consumption due to the lowered operating clock frequency of the CPU while ensuring correct operation of the peripheral circuit.

In order to achieve the above object, according to the present invention, there is provided electronic equipment including a central processing unit (CPU) that divides the counts of pulses of an original clock from an oscillation source and switches an operating clock frequency, whereby the CPU controls a peripheral circuit, the electronic equipment comprising: specifying means for detecting the operating clock frequency switched according to the access state of a register with respect to the CPU and specifying an operating frequency mode of the CPU in correspondence with the detected operating clock frequency; generating means for generating a plurality of timing signals used for correctly operating the peripheral circuit according to the operating frequency mode specified by the specifying means; and control means for shortening the active time of each of the timing signals generated by the generating means, based on the operating frequency mode, and as a result, generating timing signals mode by mode having the shortened active time, whereby the timing signals are output to the peripheral circuit. With this arrangement, in response to a decrease in the operating frequency of the CPU so as to lower power consumption, power consumption of the peripheral circuit is also inhibited while ensuring the correct operation.

The control means may preferably generate the timing signals mode by mode having the shortened active time based on the original clock to be input into the CPU from the oscillation source, a system clock obtained by dividing the counts of pulses of the original clock, and the operating frequency mode. It is thus possible to generate timing signals mode by mode which ensures the correct operation.

Further objects, features and advantages of the present invention will become apparent from the following description of the preferred embodiments with reference to the attached drawings.

DETAILED DESCRIPTION OF THE PREFERRED EMBODIMENT

Figure 1:
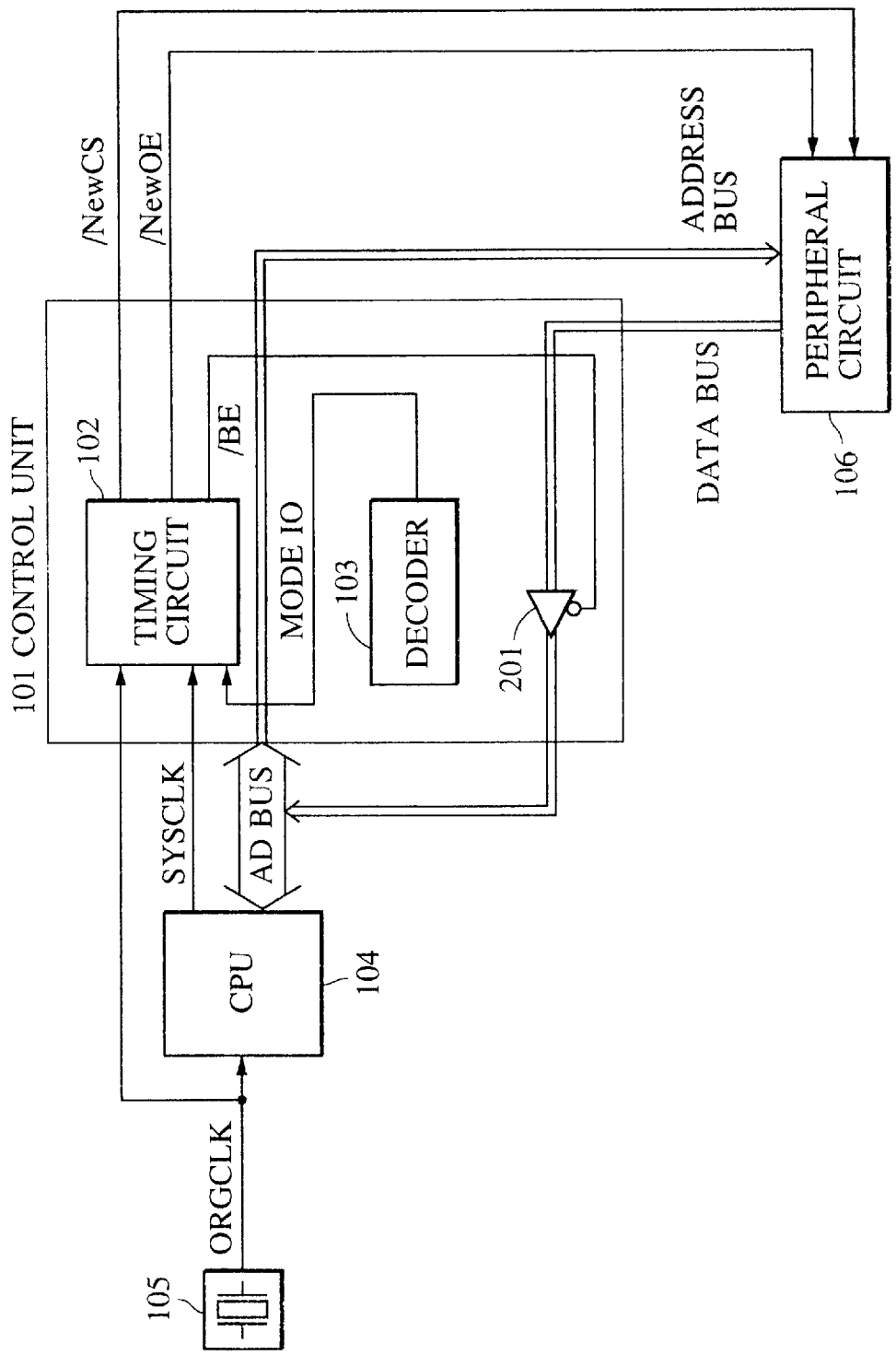
FIG. 1 is a block diagram of the configuration of electronic equipment according to a first embodiment of the resent invention.

Suitable embodiments of the present invention will now be described with reference to the accompanying drawings.
First Embodiment FIG. 1 is a block diagram of the configuration of electronic equipment according to a first embodiment of the present invention, the electronic equipment being applicable to, for example, a printer controller (not shown). The electronic equipment includes a control unit 101 having a timing circuit 102 and a decoder unit 103, a CPU 104, an oscillation circuit 105 and a peripheral circuit 106. The control unit 101 controls the peripheral circuit 106, such as a memory, a host interface circuit and the like, (a memory in this embodiment, in particular, a ROM or the like), and also performs data exchanges with the CPU 104. The timing circuit 102 generates a control signal for rendering the peripheral circuit (ROM) 106 operable by use of the system clock SYSCLK that is output from the CPU 104. In a third embodiment the timing circuit 102 also uses, as well as the system clock SYSCLK, the original clock ORGCLK that is output from an oscillation circuit 105, which will be described below in a greater detail. The decoder unit 103 generates a signal for specifying a mode corresponding to the current operating frequency of the CPU 104. The CPU 104 exerts control over the operation of the entire printer controller. The oscillation circuit 105 outputs the original clock ORGCLK to the CPU 104.

Figure 2:
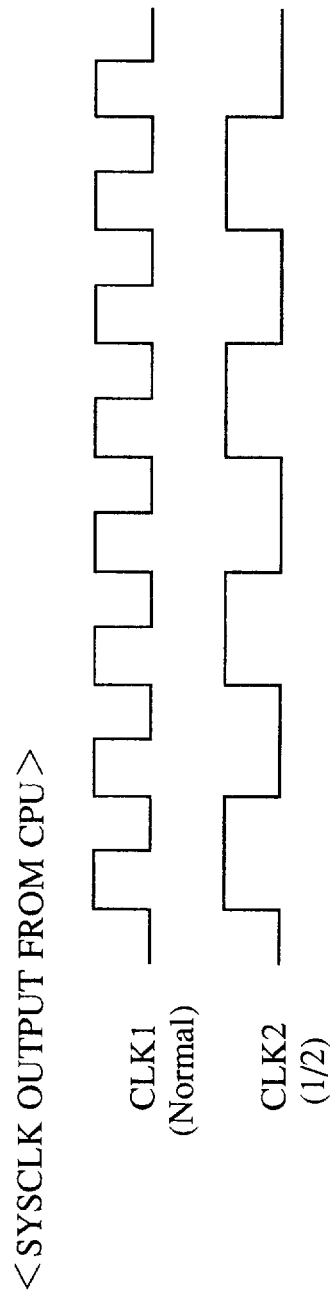
FIG. 2 is a timing chart illustrating the frequency switching state of the system clock that is output from the CPU shown in FIG. 1.

FIG. 2 is a timing chart of the frequency switching state of the system clock SYSCLK that is output from the CPU 104 shown in FIG. 1. As illustrated in FIG. 2, the CPU 104 is adapted to switch the operating frequency of the system clock SYSCLK by rewriting a predetermined internal register, from CLK1 in the normal mode to CLK2, i.e., by the amount of one half of the original frequency. During this switching operation, as will be described below, the mode IO signal for specifying the current operating frequency is sent from the decoder 103 to the timing circuit 102. In FIG. 2, CLK1 corresponds to the operating frequency in the normal mode of the system clock SYSCLK, while CLK2 is associated with one half of the operating frequency of CLK1. CLK1 may be switched to CLK3 or CLK4 in such a fashion that the operating frequency in the normal mode is decreased by one fourth or one eighth.

Figure 3:
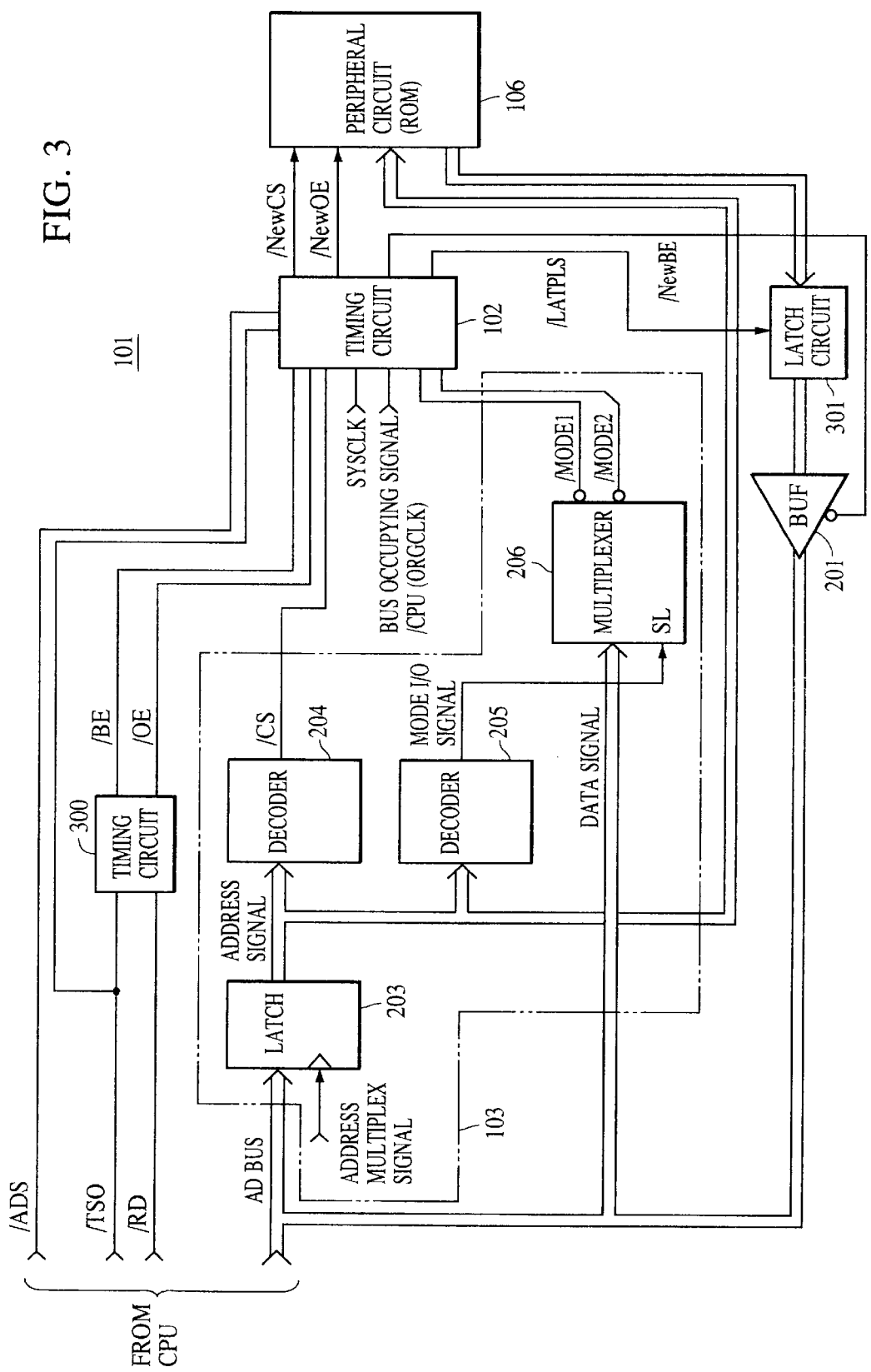
FIG. 3 is a block diagram of the control unit shown in FIG. 1.

FIG. 3 is a block diagram of an example of the configuration of the control unit 101. The decoder unit 103 has, for example, a latch circuit 203, decoders 204 and 205, and a multiplexer 206. An address signal from the CPU 104 is latched in the latch circuit 203 under control of an address multiplexer signal. The latched address is decoded by the decoder 204, and if it is an address of the peripheral circuit 106, a chip select signal /CS (hereinafter "/" will refer to active low) is output from the decoder 204.

The CPU 104 is programmed in the following manner. For rewriting a predetermined internal register to switch the operating frequency (change the operating mode), the CPU 104 outputs data corresponding to a new mode to the predetermined address. The decoder 205 decodes the predetermined address, and the multiplexer 206 is caused to make a selection based on the data output to the address by the CPU 104. The multiplexer 206, based on the input data, selectively outputs either of signal /Mode 1 or signal /Mode 2. The selected signal is held until the mode is switched for a subsequent time. Although this embodiment will be explained in the case in which there are two modes to be switched, there may be three or more modes as described above. If there are three modes, an extra signal, i.e., signal /Mode 3 is output.

Strobe signals /ADS and /TSO and read signal /RD are input from the CPU 104. Strobe signals /ADS and /TSO are input to the timing circuit 102. A timing circuit 300 adjusts the timings of strobe signal /TSO and read signal /RD and generates enabling signals /BE and /OE. Based on strobe signal /ADS, and enabling signals /BE and /OE, the timing circuit 102 generates chip select signal /NewCS and enabling signal /NewOE to be sent to the peripheral circuit 106, latch pulse /LATPLS to be sent to the latch circuit 301, used for latching the data from the peripheral circuit 106, and enabling signal /NewBE to be output to a buffer 201.

Figure 4:
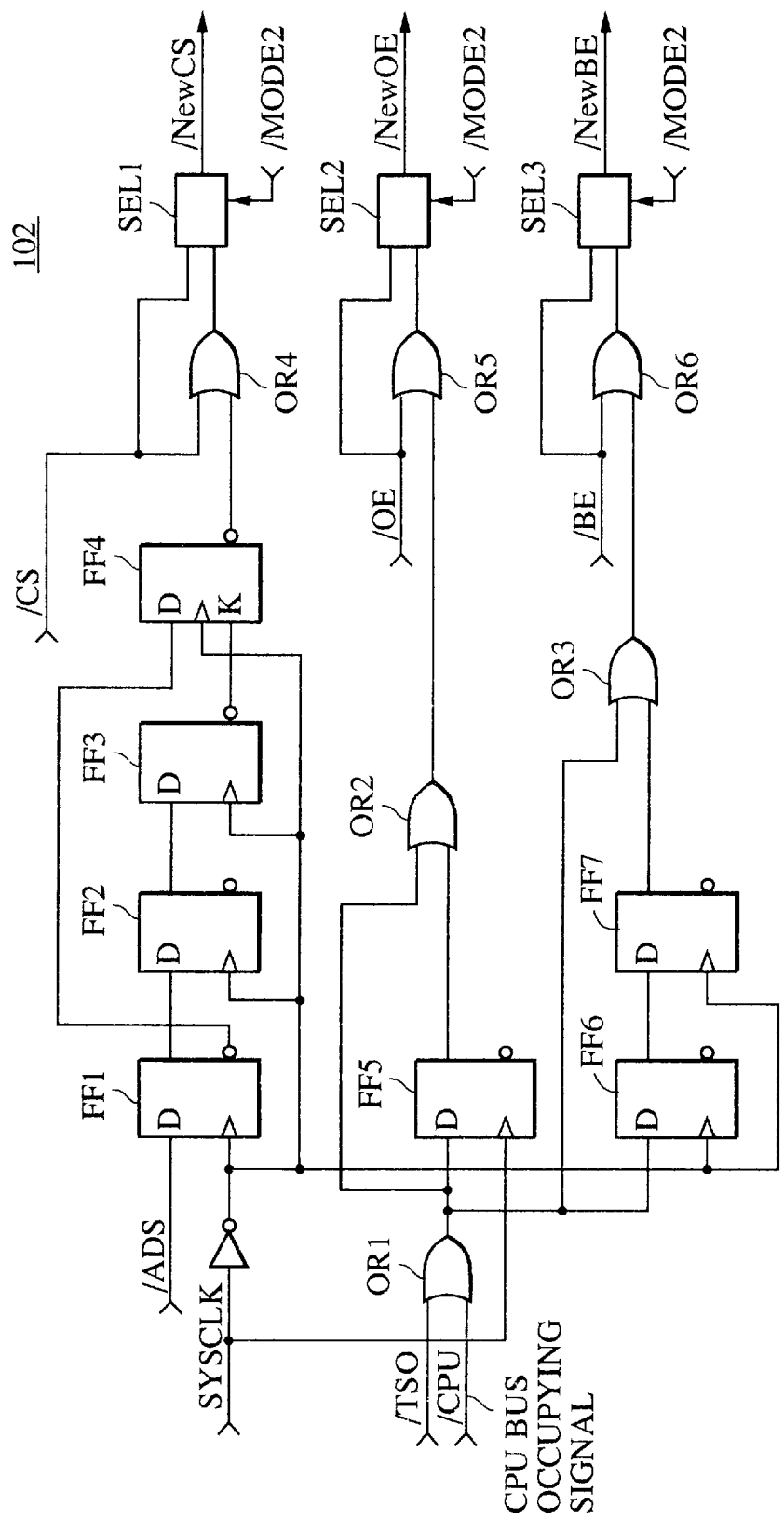
FIG. 4 is a circuit diagram of an example of the timing circuit shown in FIG. 1.
Figure 5:
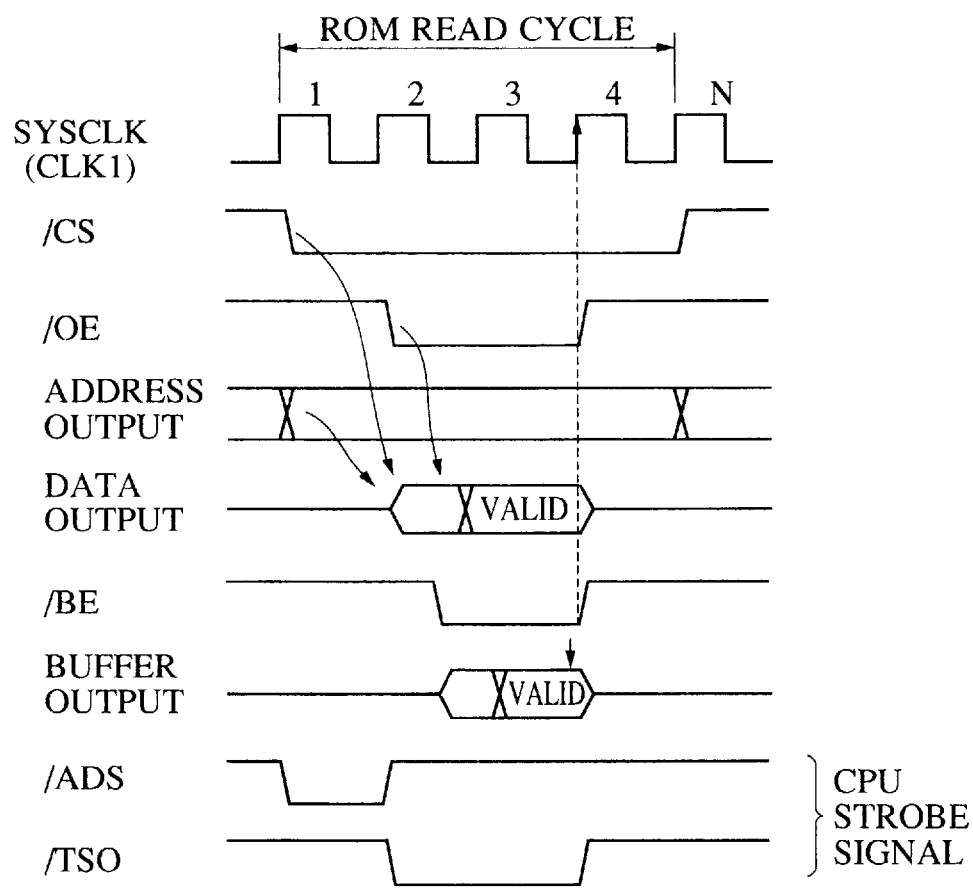
FIG. 5 is a timing chart illustrating the operation of the respective elements shown in FIG. 4.
Figure 6:
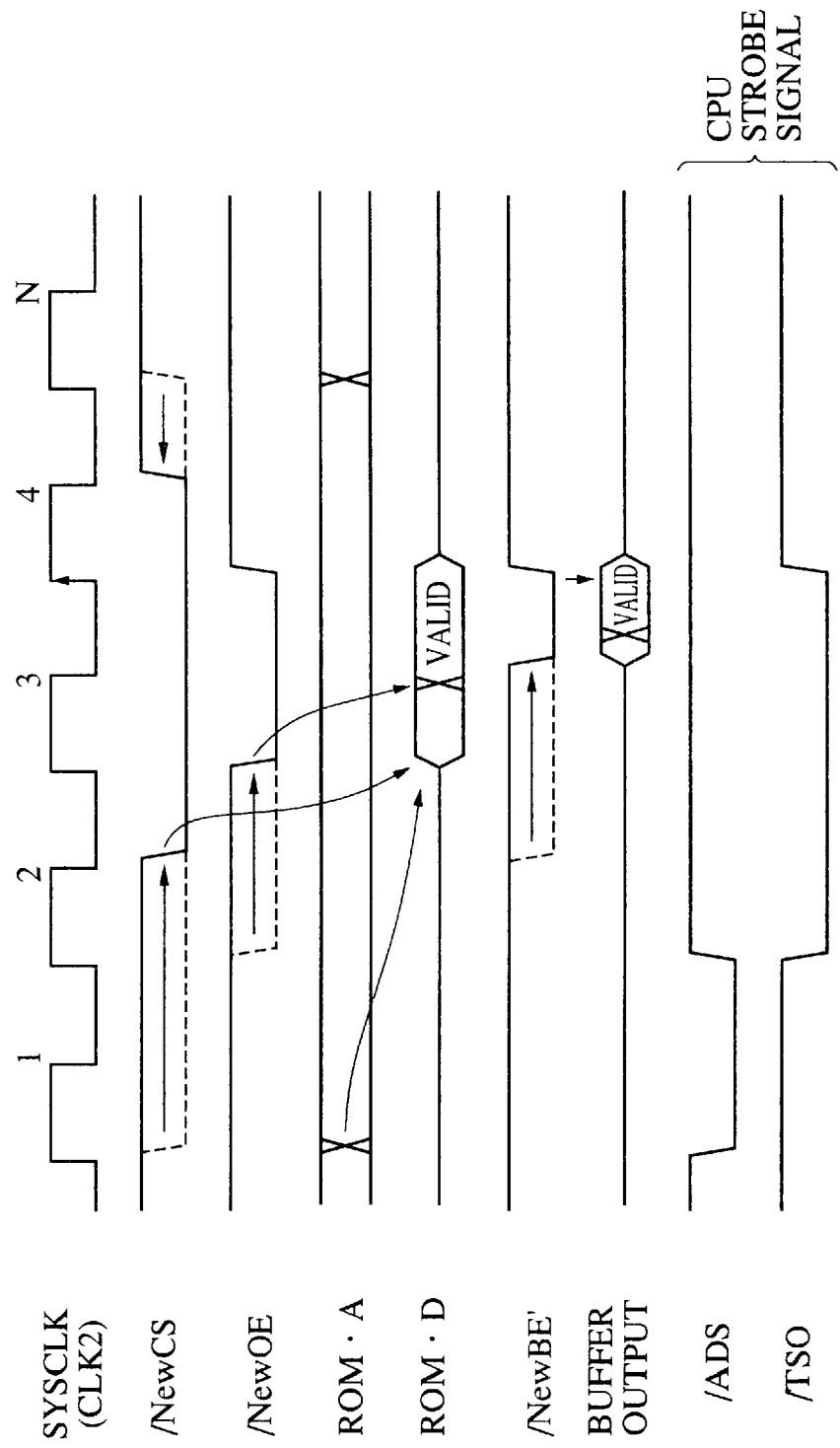
FIG. 6 is a timing chart illustrating the operation of the respective elements shown in FIG. 4.

FIG. 4 is a circuit diagram of the configuration of the above-described timing circuit 102. FIGS. 5 and 6 are timing charts of signals input into and output from the timing circuit 102. An explanation will now be given with reference to the drawings. FIG. 5 is a timing chart of signals obtained in the normal mode of the operating frequency in which power is supplied or the CPU 104 outputs signal CLK1 as system clock SYSCLK through use of software. In this mode, selectors SEL1, SEL2 and SEL3 select signals /CS, /OE and /BE, respectively, each signal being input into one input terminal of each selector. Signals /CS, /OE and /BE are output as /NewCS, /NewOE and /NewBE from the selectors SEL1 to SEL3, respectively, these signals being shown as /CS, /OE and /BE in FIG. 5. In this mode, the timings of the respective output signals are provided in a manner similar to the prior art.

An explanation will now be given of the timing chart shown in FIG. 6 of signals obtained when the CPU 104 switches the operating frequency from the normal mode to the power-saving mode to output CLK2 as system clock SYSCLK. OR circuits OR4 to OR6 are disposed to prevent the outputs of signals /NewCS, /NewOE and /NewBE when an access is made to addresses other than the address of the peripheral circuit 106. In the power-saving mode, selectors SEL1 to SEL3 select the outputs from the OR circuits OR4 to OR6, respectively.

With this arrangement, a signal, which is generated after a set of flip-flops FF1 to FF4 has adjusted the timing of strobe signal /ADS based on system clock SYSCLK, is output as chip select signal /NewCS through the OR circuit OR4 and the selector SEL1. Also, a signal, which is generated by the OR circuits OR1 and OR2 and a flip-flop FF5 utilizing strobe signal /TSO, signal /CPU and system clock SYSCLK, is output as enabling signal /NewOE through the OR circuit OR5 and the selector SEL2. A signal, which is generated by flip-flops FF6 and FF7, and the OR circuit OR3 utilizing strobe signals /TSO, /CPU and /SYSCLK, is output as signal /NewBE through the OR circuit OR6 and the selector SEL3.

FIG. 6 shows that the leading edge of /NewCS signal is delayed behind /CS signal in the normal mode system by 1.5 cycles with respect to clock SYSCLK and the trailing edge leads /CS signal by 0.5 cycle. On the other hand, the leading edges of /NewOE and /NewBE are delayed behind /OE and /BE, respectively, by one cycle with respect to SYSCLK signal. While these signals are active, power consumption in the peripheral circuit 106, the latch circuit 301 and the buffer 201 is increased. Power consumption can thus be reduced by decreasing the active period. In this embodiment /LATPLS signal has a waveform similar to /NewOE signal. The latch circuit 301 may be eliminated in this embodiment if it is not necessary.

According to this embodiment, for example, when the CPU 104 is idle without executing any processing for a certain period, the internal register is rewritten through use of software, whereby the mode IO signal for defining a new operating frequency is sent to the timing circuit 102 from the decoder 103. Simultaneously, control is exerted on the timing circuit 102 so that control signals (chip select signal /NewCS and enabling signal /NewOE) for the ROM 106 can be output at the timings shown in FIG. 6, based on the mode IO signal, system clock SYSCLK. As a result, the active time of the respective control signals can be shortened, thus making it possible to suppress power consumption of the ROM 106.

Similarly, a plurality of modes for specifying the operating frequency of the CPU 106 can also be implemented in the following manner. The timing circuit 102 determines the timings of chip select signal /NewCS and enabling signal /NewOE according to a mode IO signal corresponding to each mode. The multiplexer 206 then selects the mode based on the selected timings.

It will be appreciated from the foregoing description that this embodiment offers the following advantages. Along with a decrease in the operating frequency of the CPU 104, the enabling time of the control signal of the peripheral circuit 106 is accordingly reduced. This can drop the power consumption of the peripheral circuit 106 and achieve power savings for the overall apparatus.

Second Embodiment

Figure 7:
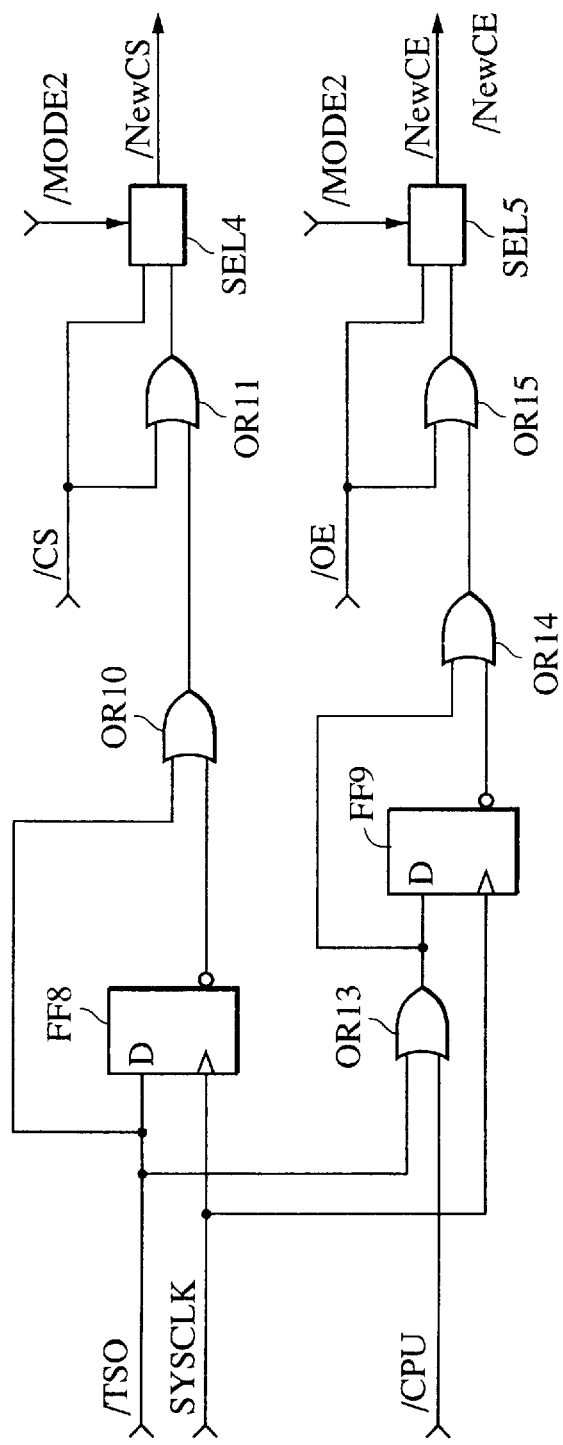
FIG. 7 is a circuit diagram of another example of the timing circuit shown in FIG. 1.
Figure 8:
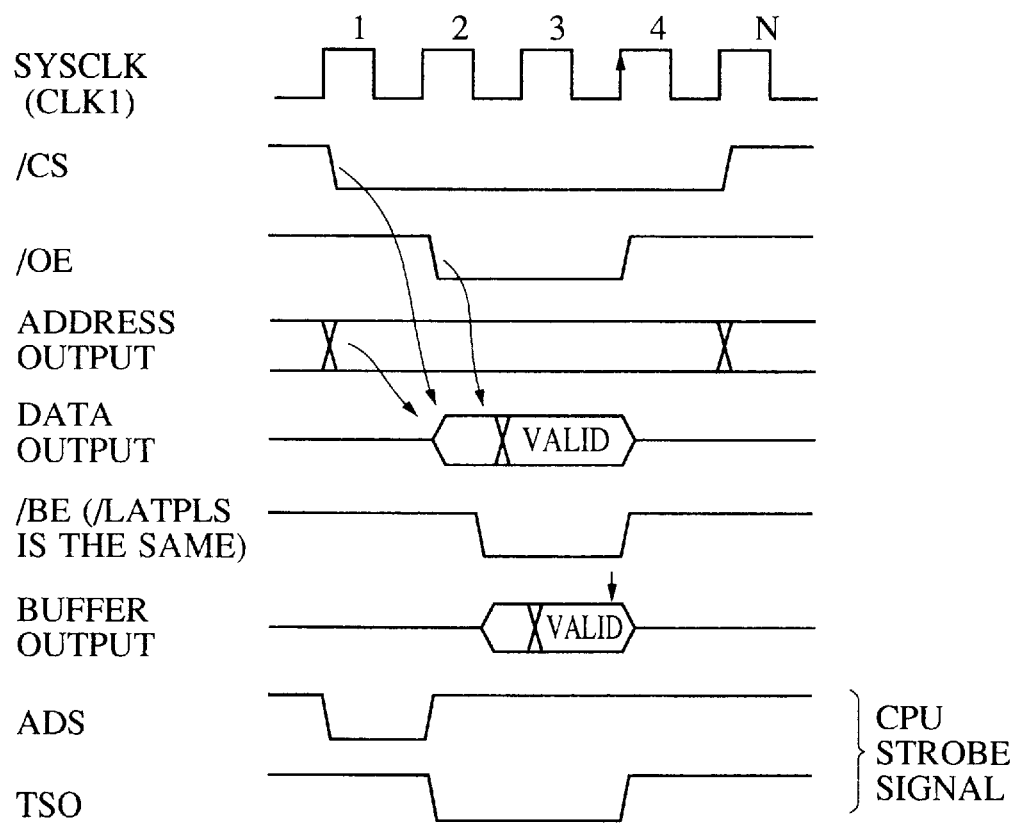
FIG. 8 is a timing chart illustrating the operation of the respective elements shown in FIG. 7.
Figure 9:
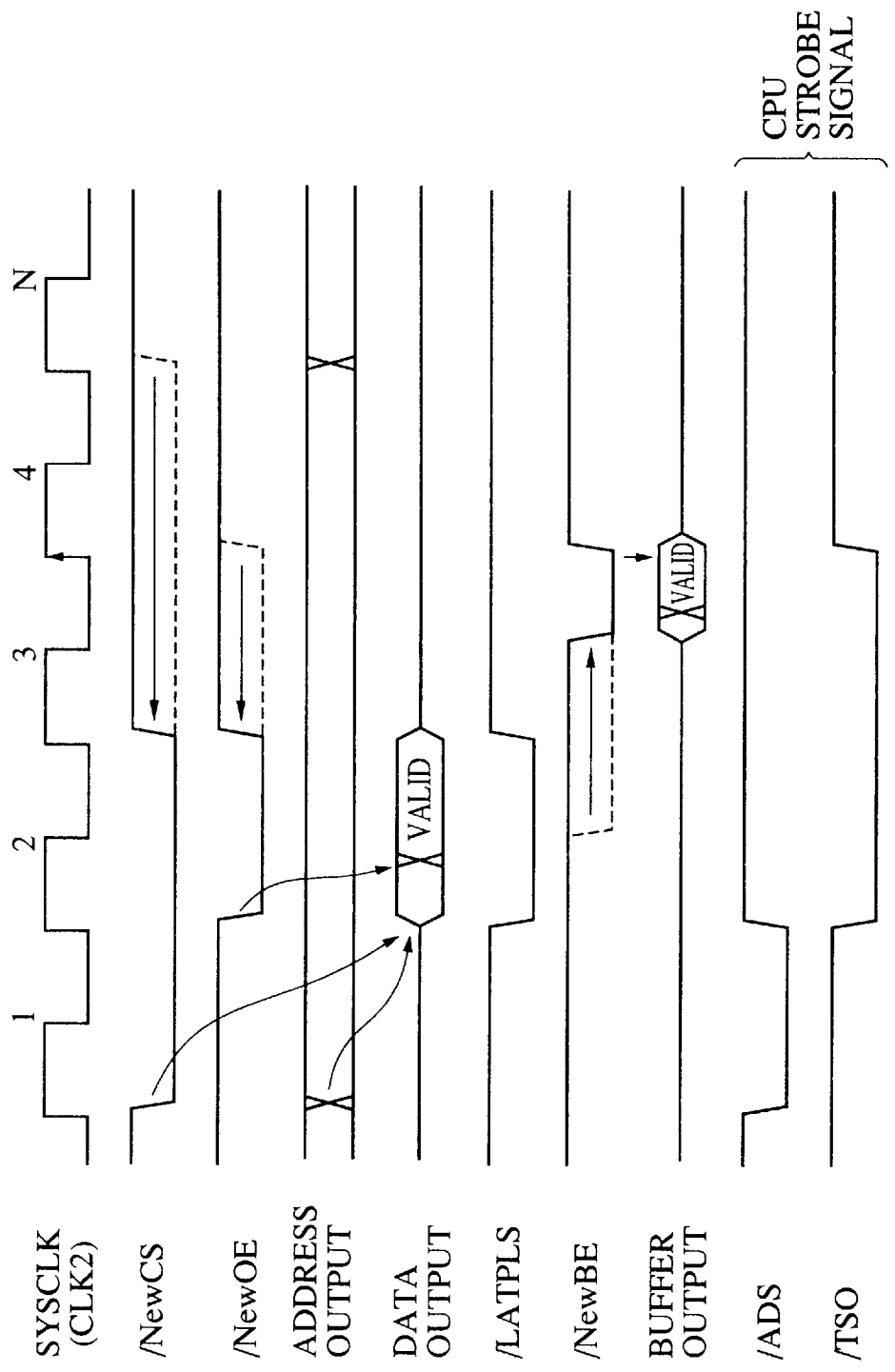
FIG. 9 is a timing chart illustrating the operation of the respective elements shown in FIG. 7.

FIG. 7 illustrates an example of another configuration of the timing circuit 102 of the control unit 101 according to a second embodiment of the present invention. FIGS. 8 and 9 are timing charts of signals input into and output from the circuit. The configuration of the portion of the circuit that outputs /NewBE signal is similar to the first embodiment, and an explanation thereof will thus be omitted from FIG. 7.

Selectors SEL4 and SEL5 and OR circuits OR11 and OR15 are similar to the selectors SEL1 and SEL2 and the OR circuits OR4 and OR5, respectively, of the first embodiment. In this embodiment the trailing edge of /NewCS signal leads /CS signal indicated by a broken line in FIG. 9 by two cycles with respect to system clock SYSCLK. On the other hand, the trailing edge of /NewOE signal leads /OE signal indicated by a broken line in FIG. 9 by one cycle. Accordingly, the output period of data from the peripheral circuit 106 is shifted from the data reading period by the CPU 104. However, this does not present any problem because data is held in the latch circuit 301 until the data output period becomes available.

Third Embodiment

Figure 10:
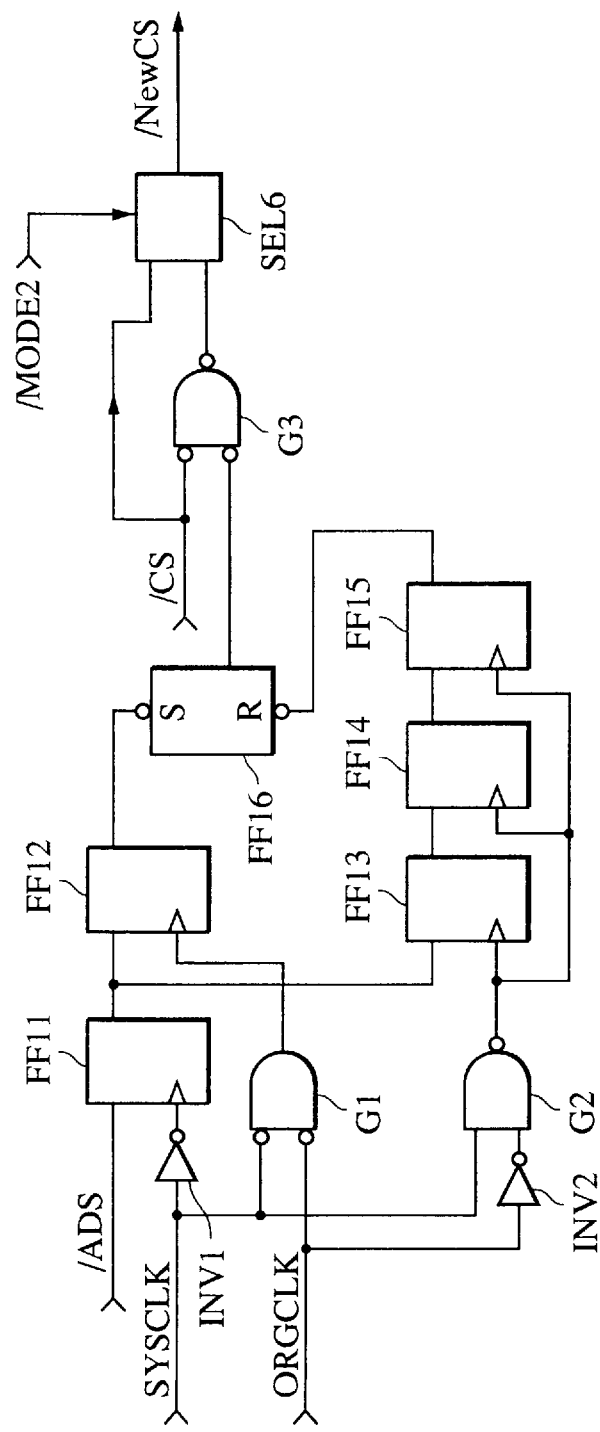
FIG. 10 is a circuit diagram of still another example of the timing circuit shown in FIG. 1.

FIG. 10 is a block diagram of still another example of the circuit portion for generating chip select signal /NewCS within the timing circuit 102 shown in FIG. 3. The portions of the circuit for generating /NewOE and /NewBE enabling signals can be constructed in a manner similar to those of the first or second embodiment. Referring to FIG. 10, INV1 and INV2 denote inverters that invert system clock SYSCLK and original clock ORGCLK, respectively. FF11 to FF16 designate a set of flip-flops that outputs chip select signal /NewCS via gates G3 and selector SEL6. G1 and G2 also indicate gates.

Figure 11:
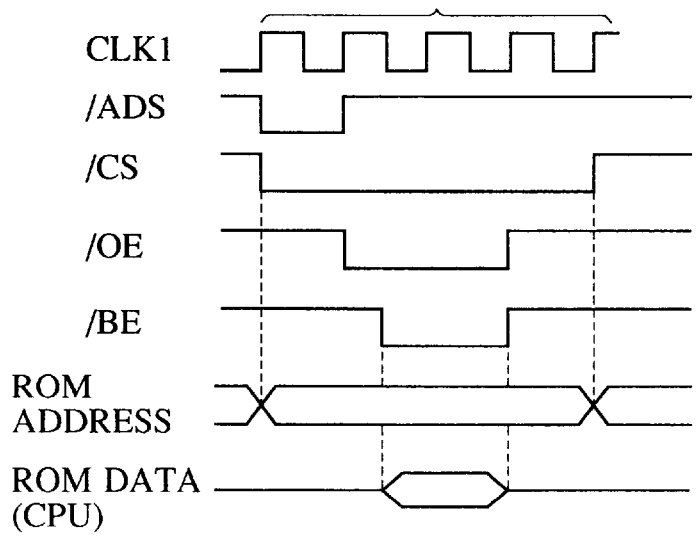
FIG. 11 is a timing chart illustrating the operation of the respective elements shown in FIG. 10.
Figure 12:
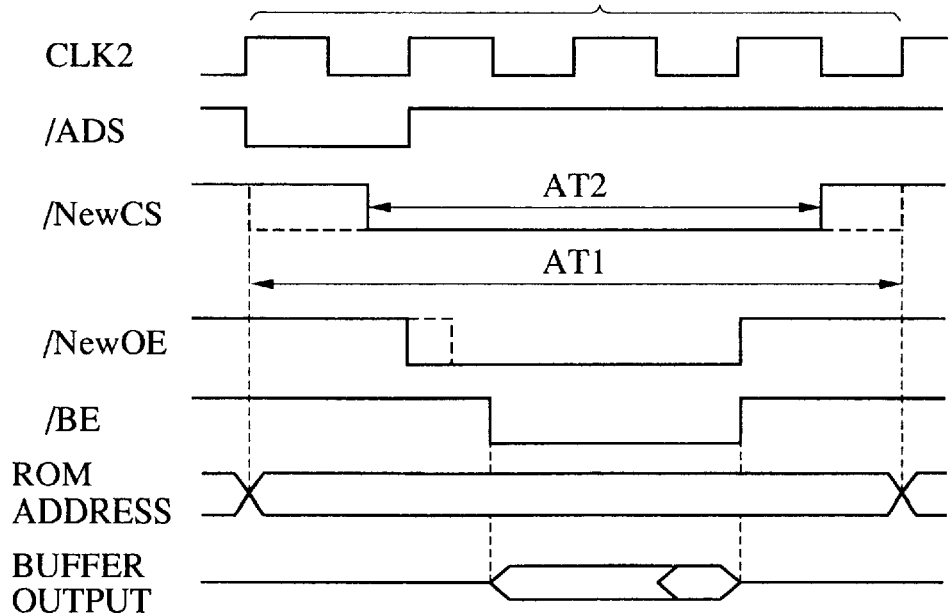
FIG. 12 is a timing chart illustrating the operation of the respective elements shown in FIG. 10.

FIGS. 11 and 12 are timing charts illustrating the operation of the respective elements shown in FIG. 10. FIG. 11 is a timing chart of the operation in the normal mode in which the operating clock of the CPU 104 is indicated by CLK1. FIG. 11 is similar to FIGS. 5 and 8, and a detailed explanation thereof will thus be omitted. As is seen from FIG. 12, when the operating clock frequency of the CPU 104 is dropped from CLK1 to CLK2, chip select signal /CS having active time AT1 is changed to /NewCS signal having active time AT2 which is then sent to the peripheral circuit 106, thus making it possible to reduce the power consumption of the peripheral circuit 106 more significantly compared to the prior art. Although in this embodiment the circuit is constructed to directly output /OE signal and /BE signal to the peripheral circuit 106 and the buffer 201, respectively, it may be substituted with that employed in the first and second embodiments so that /NewOE and /NewBE signals can be output.

In the manner discussed above, according to the third embodiment, there is provided electronic equipment comprising the CPU 104 that divides the counts of pulses of the original clock ORGCLK output from an oscillating source and switches the operating clock frequency, thereby controlling the peripheral circuit 106 (which may include the buffer 201 and the latch circuit 301). The decoder unit 103 indicates a mode corresponding to the operating frequency of the CPU 104. The electronic equipment further comprises means (timing circuit 102) for generating a plurality of timing signals for rendering the peripheral circuit operable according to the signal from the decoder unit 103. This generating means determines the active time of each timing signal based on a signal representing the mode associated with the operating frequency and generates the timing signal which is then output to the peripheral circuit.

Although in this embodiment a ROM, the buffer 201 and the latch circuit 301 are used as the peripheral circuit 106 to be controlled, other types of peripheral circuits (for example, a RAM, an extended memory card, etc.) may be controlled by changing the type of control signal to be input to the timing circuit 102. The present invention can be implemented utilizing a control signal to be input into at least one of the peripheral circuits 106, such as a ROM, the buffer 201 and the latch circuit 301. The present invention offers the advantage of changing the control over an external circuit (peripheral circuit) in a flexible manner when there is a drop in the operating frequency of the CPU, thereby achieving power savings for the overall system of the equipment. It has been assumed that throughout the specification the buffer 201 and the latch circuit 301 are used as peripheral circuits in a broad sense.

Although in the foregoing embodiments the CPU 104 changes the operating frequency by rewriting the contents of a predetermined internal register, a CPU that is able to receive a clock having a or a plurality of desired frequencies may be used. The foregoing embodiments have been discussed in which the electronic equipment of the present invention is applied to a printer controller. The present invention is, however, applicable to any type of electronic equipment loaded with a CPU that is able to switch the operating clock and includes a peripheral circuit described above by way of example.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Electronic equipment including a central processing unit (CPU) having a plurality of operating frequency modes based upon dividing counts of pulses of an operating clock signal from an oscillation source for accessing a peripheral circuit, said electronic equipment comprising:

specifying means for specifying an operating frequency mode of the CPU; and generating means for generating a plurality of timing signals for accessing the peripheral circuit according to the operating frequency mode specified by said specifying means, wherein a ratio of active time of the timing signals to a period of the operating clock signal is different in accordance with a specified mode.

2. Electronic equipment according to claim 1, wherein said generating means generates the timing signals based on the operating clock signal from the oscillation source, a system clock being obtained by dividing the counts of pulses of the operating clock signal based on the specified operating frequency mode.

3. Electronic equipment according to claim 1, wherein the peripheral circuit includes at least one of a read only memory, a three-state buffer, a random access memory, an extended memory card.

4. Electronic equipment according to claim 3, wherein the timing signals include a chip select signal.

5. Electronic equipment according to claim 3, wherein the timing signals include an enabling signal.

6. Electronic equipment according to claim 1, wherein the CPU accesses the peripheral circuit for a predetermined number of periods of the operating clock signal regardless of which one of the plurality of modes is set.

7. Electronic equipment comprising:

a central processing unit (CPU) having a plurality of modes of different operating clock frequencies; and control means for generating at least one timing signal for accessing a peripheral circuit, a ratio of active time of the timing signal to a period of an operating clock signal of said CPU is different in accordance with a set mode of said CPU.

8. Electronic equipment according to claim 7, wherein said control means generates the timing signal based on the operating clock signal input into said CPU and a system clock output from said CPU.

9. Electronic equipment according to claim 7, wherein the peripheral circuit includes at least one of a read only memory, a three-state buffer, a random access memory, an extended memory card.

10. Electronic equipment according to claim 7, wherein said timing signal includes at least one of a chip select signal and an enabling signal.

11. Electronic equipment according to claim 7, wherein said control means outputs, in response to a decrease in the operating frequency of said CPU to 1/n (n: integer), a timing signal having active time which is less than n times the original active time.

12. Electronic equipment according to claim 7, wherein said CPU accesses the peripheral circuit for a predetermined number of periods of the operating clock signal regardless of which one of the plurality of modes is set.

* * * * *

UNITED STATES PATENT AND TRADEMARK OFFICE
CERTIFICATE OF CORRECTION

PATENT NO. : 5,822,572

DATED : October 13, 1998

INVENTOR(S) : TADASHI KAWAGUCHI ET AL.   Page 1 of 2

It is certified that error appears in the above-identified patent and that said Letters Patent is hereby corrected as shown below:

Drawings:
SHEET 11

Fig. 11, "MORMAL" should read --NORMAL--.

COLUMN 2

Line 19, "resent" should read --present--.
    Line 47, "EMBODIMENT" should read --EMBODIMENTS--.

COLUMN 3

Line 2, "a greater" should read --greater--.

COLUMN 6

Line 64, "an" should read --and an--.

COLUMN 7

Line 13, "is" should read --being--.

UNITED STATES PATENT AND TRADEMARK OFFICE
CERTIFICATE OF CORRECTION

PATENT NO. : 5,822,572

DATED : October 13, 1998

INVENTOR(S) : TADASHI KAWAGUCHI ET AL.

It is certified that error appears in the above-identified patent and that said Letters Patent is hereby corrected as shown below:

<u>COLUMN 8</u>

Line 3, "an" should read --and an--.

Signed and Sealed this

Fourteenth Day of December, 1999

Attest:

Attesting Officer

Q. TODD DICKINSON

Acting Commissioner of Patents and Trademarks